(12) United States Patent
Hendriks et al.

(10) Patent No.: US 9,140,892 B2
(45) Date of Patent: Sep. 22, 2015

(54) ELECTROWETTING DISPLAY DEVICE

(71) Applicant: Liquavista B.V., Eindhoven (NL)

(72) Inventors: Christian Etienne Hendriks, Eindhoven (NL); Romaric Mathieu Massard, Eindhoven (NL); Mathieu Hampton, Eindhoven (NL); Daniel Figura, Bratislava (SK)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/305,512

(22) Filed: Jun. 16, 2014

(65) Prior Publication Data

US 2014/0293395 A1 Oct. 2, 2014

Related U.S. Application Data

(63) Continuation of application No. PCT/EP2012/075588, filed on Dec. 14, 2012.

(30) Foreign Application Priority Data

Dec. 16, 2011 (GB) .................. 1121707.2

(51) Int. Cl.
*G02B 26/00* (2006.01)

(52) U.S. Cl.
CPC .................. *G02B 26/005* (2013.01)

(58) Field of Classification Search
USPC ......... 359/290–298, 243, 260–263, 244, 276, 359/665, 666
See application file for complete search history.

(56) References Cited

U.S. PATENT DOCUMENTS

| 7,821,699 | B1 | 10/2010 | Lo et al. | |
| 8,730,555 | B2* | 5/2014 | Aubert et al. | 359/290 |
| 8,908,254 | B2* | 12/2014 | Feenstra et al. | 359/290 |
| 2009/0103159 | A1* | 4/2009 | Cheng et al. | 359/228 |
| 2009/0168144 | A1* | 7/2009 | Lo et al. | 359/290 |
| 2009/0169806 | A1 | 7/2009 | Lo et al. | |
| 2009/0284824 | A1 | 11/2009 | Feenstra et al. | |
| 2010/0321760 | A1 | 12/2010 | Hayes et al. | |

FOREIGN PATENT DOCUMENTS

| WO | 2004104670 A1 | 12/2004 |
| WO | 2007141218 A1 | 12/2007 |
| WO | 2009133079 A1 | 11/2009 |

OTHER PUBLICATIONS

Andrea Giraldo, et al., "Improved Oil Motion Control and Hysteresis-Free Pixel Switching of Electrowetting Displays", SID 2012 Digest, vol. 43, Issue 1, pp. 625-628, (cited in ISR and Written Opinion).

* cited by examiner

Primary Examiner — Mohammed Hasan
(74) Attorney, Agent, or Firm — BainwoodHuang

(57) ABSTRACT

An electrowetting display device comprising at least one picture element including a first fluid and a second fluid immiscible with the first fluid. A protrusion arranged through the second fluid and in contact with the first fluid provides a preferential initiation of motion of part of the first fluid in a first direction and a different part of the first fluid in a second direction.

21 Claims, 9 Drawing Sheets

ELECTROWETTING DISPLAY DEVICE

CROSS REFERENCE TO RELATED APPLICATIONS

This application is a continuation of PCT International Application PCT/EP2012/075588 filed Dec. 14, 2012.

BACKGROUND

A known display includes a hydrophilic separator and a protruding spacer.

In one known electrowetting display device, a supporting member has an extending member protruding downward from a side wall of a rib part of the device. A non-polar solution near the extending member is repelled by the extending member which is hydrophilic, to form an arc position of the non-polar solution. Therefore, the non-polar solution shrinks from the arc position when a voltage is applied to an electrode.

It is desirable to provide an alternative electrowetting display device.

DETAILED DESCRIPTION

Figure 1:
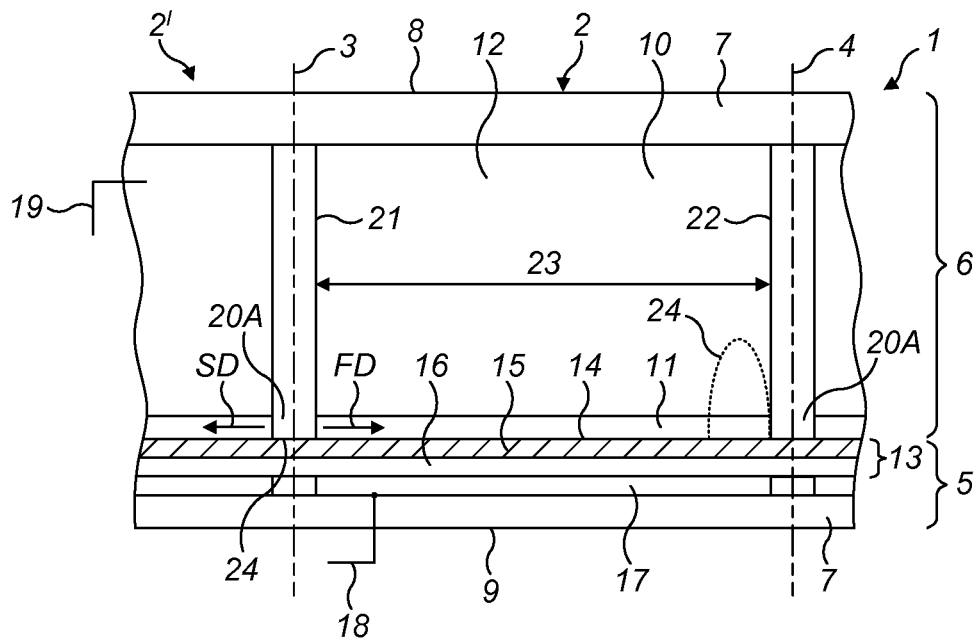
FIGS. 1, 2 and 3 show schematic cross sections of a picture element according to an embodiment.

The entire contents of the following applications are incorporated herein by reference:

1. PCT/EP2012/075588 filed Dec. 14, 2012.
2. GB 1121707.2 filed Dec. 16, 2011.

Embodiments described herein relate to an electrowetting display device.

In accordance with first embodiments, there is provided an electrowetting display device comprising a first support plate, a second support plate and at least one picture element comprising a space between the first and second support plates, the space including a first fluid and a second fluid immiscible with the first fluid, the first and second fluids having a first configuration when a zero voltage is applied to the second fluid and a different, second configuration when a non-zero voltage is applied to the second fluid, wherein the at least one picture element comprises a protrusion arranged through the second fluid and in contact with the first fluid in the first configuration to provide a preferential initiation of motion of part of the first fluid in a first direction and a different part of the first fluid in a second direction for switching from the first configuration to the second configuration.

By arranging the protrusion to initiate first fluid motion in at least two directions, including the first direction and the second direction, the first embodiments provide a new variable for designing an electrowetting display device. Accordingly, the embodiments give greater design freedom for controlling where motion of the first fluid preferentially initiates, and may therefore be used to give greater control of the motion of the first fluid after its preferential initiation.

In embodiments, the at least one picture element may include a first picture element and a second picture element, wherein the protrusion is arranged to provide the first direction in the first picture element and the second direction in the second picture element. Thus, the protrusion may preferentially initiate first fluid motion in for example two picture elements, without requiring a separate protrusion per picture element. In some examples, the protrusion is a first protrusion and the picture element comprises a second protrusion. Such embodiments with more than one protrusion provide efficient first fluid initiation and motion. The positioning and shape of the protrusions relative to each other may be selected to tune the first fluid initiation and motion behaviour. The protrusion may be a wall of the second support plate arranged to define a side of the at least one picture element. The protrusion may therefore perform a double function; firstly, preferential initiation of the first fluid in the first and second picture elements, and secondly, defining a side of a picture element to provide a wall for confining the first fluid at a side of a picture element. The protrusion may further be arranged at least partly to confine the second fluid to the at least one picture element.

In alternative embodiments, the at least one picture element comprises a first picture element and the protrusion is arranged to provide the first and second directions in the first picture element. Therefore, the protrusion may be arranged within one picture element, thus providing accurate and reliable control of first fluid in the picture element. For example, the protrusion may be arranged in a corner of the picture element, so that first fluid motion initiates in that corner, continues across the picture element, and ends in a diagonally opposite corner.

In some embodiments the protrusion may contact the surface of the first fluid, but does not penetrate it. In alternative embodiments, the protrusion is arranged at least partly through the first fluid when in the first configuration. In other words the protrusion is at least partly immersed in the first fluid. In this way, and in embodiments where the protrusion is separated from a surface of the first support plate by part of the first fluid, the thickness of the part of the first fluid between the protrusion and the surface is less than the thickness of a part of the first fluid surrounding the part of first fluid between the protrusion and the surface. Thus, when a suitable voltage is applied to the second fluid, for example by applying a voltage between the second fluid and an electrode of the first support plate, first fluid motion initiates at the thinner part of the first fluid, since the electric field caused by the applied voltage is greater at the protrusion than at the surrounding thicker first fluid. Accordingly, the depth of protrusion immersion in the first fluid may be selected to determine the initiation characteristics of the first fluid; the greater the immersion the thinner the first fluid thickness, and thus the lower the applied voltage required for initiation.

In some embodiments, the protrusion is arranged to reduce an extent of movement of the second support plate towards the first support plate. Therefore, as will be described later, the protrusion may function as a spacer and reduce if not prevent a "lowering ceiling effect" and/or a "tsunami effect" in the device.

The protrusion may be part of a preventer arranged to reduce an extent of movement of the second support plate towards the first support plate. A preventer may be provided in the at least one picture element to address the problems of the "lowering ceiling effect" and the "tsunami effect" described further below. In embodiments below the preventer may be a spacer, as explained later. The protrusion may be part of such a preventer, therefore providing a simple design and manufacture of a picture element, without needing to form the protrusion as a separate part of the picture element. In some embodiments, the protrusion is formed by a part of the preventer with a width greater than a width of a wall part supporting the part of the preventer. Such embodiments are simple to manufacture.

A shape of the protrusion may be arranged to determine the first direction and the second direction. Thus, the position of initiation of the first fluid motion in the picture element, and the consequent directions of first fluid motion, may be accurately controlled, for reliable and consistent switching of the fluid configuration.

A wettability to the first fluid of a surface of the protrusion may be arranged to determine the first direction and the second direction. Selecting the wettability of the protrusion surface gives further control and predictability of the initiation and subsequent directions of first fluid motion. For example, the protrusion surface may have a low wettability to the first fluid. Thus a meniscus between the first and second fluids may form a curve from under the protrusion to the higher meniscus level surrounding the protrusion. This curved meniscus may assist smooth switching of the configuration of the fluids.

In some embodiments, the electrowetting display device comprises at least one wall of the first support plate which may be arranged to confine at least part of the first fluid of the at least one picture element, at least one of said protrusion being arranged to confine at least part of the first fluid and second fluid of the at least one picture element. The at least one wall and the at least one protrusion may therefore co-operate to define a picture element. For example, two parallel walls and two parallel protrusions perpendicular to the two walls may interlock to form a picture element with for example a square display area. The protrusions may therefore perform the function of picture element walls. The interlocking may provide simple assembly of the device by self-alignment of the walls and the protrusions.

In such embodiments, the wettability to the first fluid of the at least one wall may be different from a wettability to the first fluid of the at least one protrusion. With the difference in wettability of different walls of the picture element, the arrangement of the fluids in the picture element may be accurately controlled, for example to influence a direction of motion of the first and/or second fluids in the picture element when a voltage is applied.

In accordance with the desired functionality of the protrusion, as described in further detail previously and later, at least part of the protrusion may be separated from a surface of the first support plate by part of the first fluid, for example where the protrusion determines initiation of first fluid motion in the first and second directions in one picture element, or where at least part of the protrusion contacts a surface of the first support plate, where for example the protrusion functions as a picture element wall.

In certain embodiments, the protrusion is part of the second support plate. In other embodiments, the protrusion may be part of the first support plate. For example, where the protrusion is arranged to provide the first and second directions in one picture element, the protrusion may be part of a picture element wall formed as part of the first support plate.

In certain embodiments, the protrusion is spaced from a wall of the picture element. In such embodiments, the protrusion therefore does not touch, i.e. does not lie adjacent to, a picture element wall, thus forming a space, i.e. a separation between the wall and protrusion. This separation may be used to help obtain a desirable flow of first fluid in the picture element. Moreover, if the protrusion is part of the second support plate, for fitting with the first support plate with walls, the separation gives room between the protrusion and at least one wall of the first support plate. This gives greater tolerance in the manufacturing precision of the protrusion and first support plate walls to ensure correct interlocking of the first and second support plates when assembling the device. Thus there is more design freedom for the picture element. Further, the separation gives more design freedom in examples where the shape of the protrusion is chosen to determine the preferential initiation. Moreover, with the separation between the protrusion and a wall of the first support plate, there is space for movement of the protrusion towards the wall if the display device is flexed, without damaging the protrusion, the wall or layers of the first support plate.

In accordance with further embodiments, there is provided a support plate comprising the protrusion according to embodiments. Therefore, features of the support plate described above may be provided in for example an electrowetting display device when the support plate is assembled in such a device.

FIG. 1 shows a schematic cross-section of part of an electrowetting display device 1. The display device includes a plurality of picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may each include a glass or polymer substrate 7 and may be rigid or flexible.

The display device has a viewing side 8 on which an image or display formed by the display device can be viewed and a rear side 9. In the Figure the first support plate 5 faces the rear side 9; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12 at least one of which may be a liquid. The second fluid is immiscible with the first fluid. The second fluid is electrically conductive or polar, and may be water or a salt solution such as a solution of potassium chloride in water. The second fluid may be transparent, but may be coloured, scattering, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a colour filter. For this purpose the first fluid may be coloured by addition of pigment particles or dye. Alternatively, the first fluid may be black, i.e. absorb substantially all parts of the optical spectrum, scattering or reflecting. A reflective layer may reflect the entire visible spectrum, making the layer appear white, or part of it, making it have a colour.

The support plate 5 includes an insulating layer 13. The insulating layer may be transparent or reflective. The insulating layer 13 may extend between walls of a picture element. However, to avoid short circuits between the second fluid 12 and electrodes arranged under the insulating layer, layers of the insulating layer may extend uninterrupted over a plurality of picture elements 2, as shown in the Figure. The insulating layer has a hydrophobic surface 14 facing the space 10 of the picture element 2. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The barrier layer 16 may have a thickness, taken in a direction perpendicular the plane of the substrate, between 100 nm and 150 nm and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid.

Each element 2 includes an electrode 17 as part of the support plate 5. The electrode 17 is separated from the fluids by the insulating layer 13; electrodes of neighbouring picture elements are separated by a non-conducting layer. In some embodiments, further layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode connected to the signal line 19 may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display driving system. In a display device having the picture elements arranged in a matrix form, the electrodes can be coupled to a matrix of control lines on the substrate 7.

The first fluid 11 is confined to one picture element by walls that follow the cross-section of the picture element. The cross-section of a picture element may have any shape; when the picture elements are arranged in a matrix form, the cross-section is usually square or rectangular.

Figure 2:
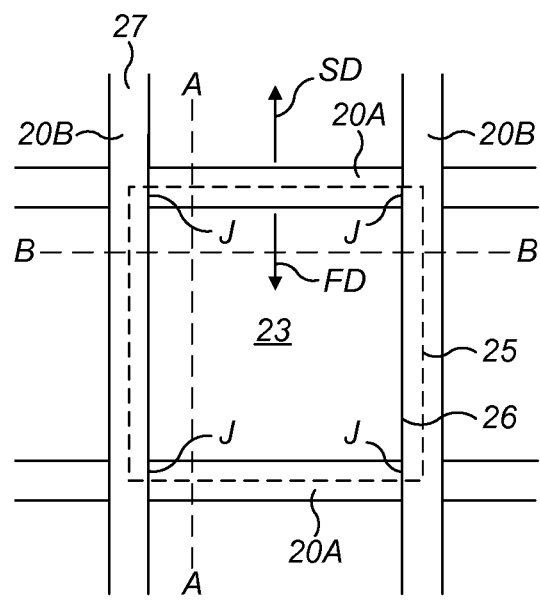

FIG. 2 shows a matrix of square picture elements in a plan view of the hydrophobic layer of the first support plate. The extent of the central picture element in FIG. 2, corresponding to the dashed lines 3 and 4 in FIG. 1, is indicated by the dashed line 25. Line 26 indicates the inner border of a wall; the line is also the edge of the display area 23. The extent of the display area 23 is indicated by the arrow between lines 21 and 22 illustrated in FIGS. 1 and 3.

Figure 3:
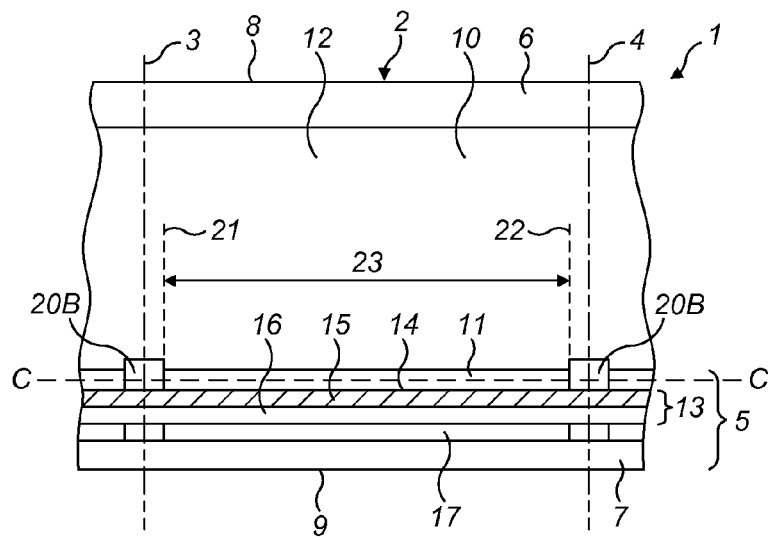

In this embodiment, the picture element comprises two pairs of walls which together define the display area 23 and therefore the sides of the picture element. FIG. 1, taken in the plane A-A shown in FIG. 2, illustrates a first pair of walls 20A. FIG. 3, taken in the plane B-B shown in FIG. 2, illustrates a second pair of walls 20B. The first pair of walls 20A is part of the second support plate 6 and the walls have a height so as to extend from the second support plate to abut the first support plate in the device. In contrast, the second pair of walls 20B is part of the first support plate 5. The second pair of walls may extend from the first to the second support plate but may instead extend partly from the first support plate to the second support plate as shown in FIG. 3. Thus, the second pair of walls may have a lower height than the first pair of walls 20A. The height of the second pair of walls is sufficient to confine at least part of the first fluid within the display area 23 in the device.

Referring to FIG. 2, which is taken in the plane C-C illustrated in FIG. 3, the first pair of walls 20A are parallel to each other and are spaced from each other by the display area 23. The second pair of walls 20B similarly are parallel to each other and are spaced apart by the display area 23. The first pair of walls 20A and the second pair of walls 20B are arranged to interlock with each other to form the picture element. The joins J between the first and second pairs of walls are illustrated in FIG. 2. In this way, in the picture element, at least one wall of the first support plate is arranged to confine at least part of the first fluid, and at least one protrusion is arranged to confine at least part of the first and second fluid.

Figure 4:
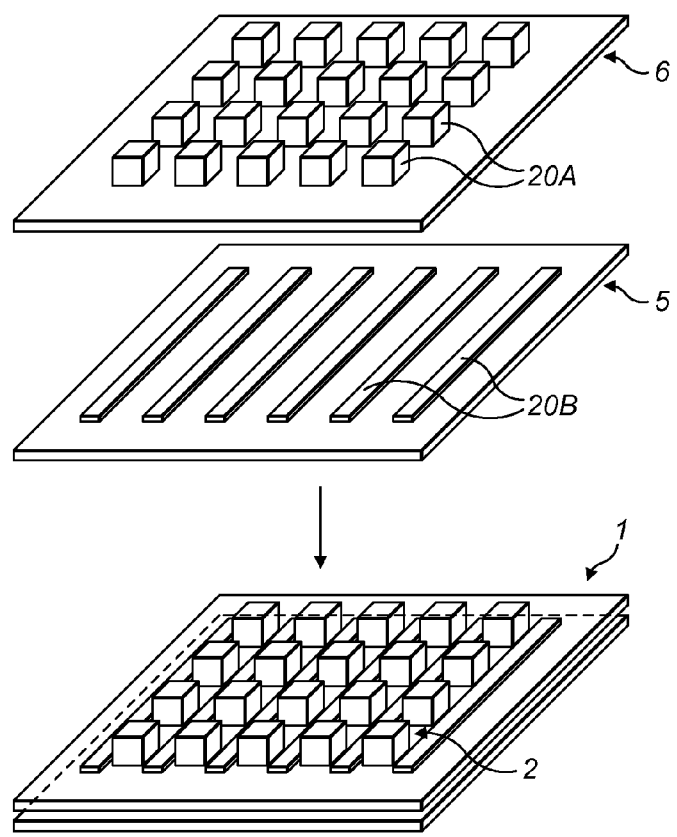
FIG. 4 shows schematically an assembly process of part of a display device.

FIG. 4 illustrates schematically an assembly process of part of the display device 1. The second support plate 6 is illustrated with the first pair of walls 20A pointing downwards. The first support plate 5 is illustrated with the second pair of walls 20B pointing upwards. When the first and second support plates 5, 6 are brought together, the first pair of walls 20A interlocks with the second pair of walls 20B to define a picture element 2. The first pair of walls 20A abut the first support plate 5, thus defining a height of the space 10.

As FIG. 4 illustrates, the second support plate 6 may comprise a plurality of walls 20A and the first support plate 5 may comprise a plurality of walls 20B arranged to interlock with each other; for example each wall of the first support plate may be part of a longer wall of the first support plate. Thus, when the first and second support plates are brought together, with the walls interlocking, a display device with a matrix of picture elements may be assembled.

Referring again to FIG. 1, the configuration of the first and second fluids 11, 12 can be changed in dependence on a voltage applied to the second fluid, for example between the second fluid and the electrode 17, as is known in the art. FIG. 1 illustrates a first configuration where a zero voltage is applied. In the first configuration the first fluid 11 forms a layer, for example with a uniform thickness, on the surface 14 of the hydrophobic layer 15. Application of a non-zero voltage of sufficient magnitude will change the first configuration to a different second configuration with for example the first fluid contracted against a wall as shown by the dashed shape 24 in FIG. 1. The controllable shape of the first fluid is used to operate the picture element as a light valve, providing a display effect over the display area 23. It is to be understood that further fluid configurations are envisaged, depending on the magnitude of voltage applied.

In accordance with embodiments, the display device comprises at least one picture element comprising a protrusion. The protrusion is arranged through the second fluid 12 and in contact with the first fluid 11 in the first configuration. In this example the protrusion is arranged through the first fluid also. In this embodiment each of the first pair of walls 20A is an example of the protrusion of the picture element 2. These protrusions are part of the second support plate 6. Thus the protrusion is arranged at least partly to confine the second fluid to the picture element. The function of the protrusion will now be explained with reference to the left hand wall 20A illustrated in FIG. 1.

The protrusion is arranged to provide a preferential initiation of motion of a part of the first fluid in a first direction and a different part of the first fluid in a second direction, for switching the first configuration to the second configuration.

Figure 5:
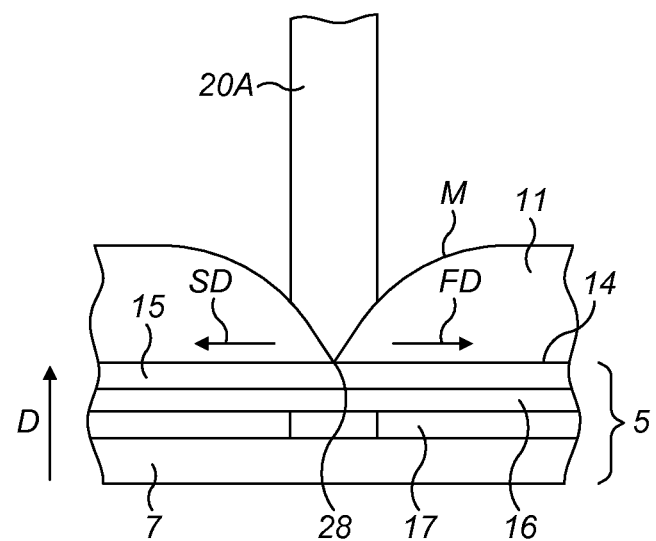
FIGS. 5 and 6 show schematically embodiments of a protrusion according to an embodiment.

As illustrated in FIGS. 1 and 2, in this embodiment the protrusion is arranged to provide the first direction FD in a first picture element, namely the picture element 2 illustrated in FIG. 1, and the second direction SD in a second picture element, namely in this example the picture element 2' partly illustrated in FIG. 1 left of the picture element 2. Therefore, when a suitably high non-zero voltage is applied to the second fluid in the first picture element 2, movement of a part of the first fluid initiates at the protrusion, i.e. the left hand wall, and continues in the first direction FD, away from the protrusion. When a suitably high non-zero voltage is applied to the second picture element 22, movement of a different part of the first fluid in the second picture element 22 initiates at the protrusion and continues in a different, second direction SD, away from the protrusion. To assist the preferential initiation occurring at the protrusion, rather than at other walls of the picture element, a shape of the protrusion may be arranged to determine the first and second direction. For example, a surface 24 of the protrusion 20A facing towards and contacting the first support plate may not be flat as illustrated in FIG. 1, but instead may have a triangular cross section as illustrated in FIG. 5. Thus the protrusion in cross-section forms a point 28, and therefore a ridge along the protrusion; at least part of the protrusion therefore contacts the surface 14 of the first support plate 5. The contact is sufficiently close to prevent the first and second fluids from passing between the ridge and the surface 14. With such a shape, part of the first fluid lies between, and therefore separates, at least part of the protrusion and the surface 14 of the hydrophobic layer. Thus a thickness of the first fluid under the protrusion reduces towards the point 28, and indeed may have an effect on the curvature of a meniscus M between the first and second fluids. The thickness is taken in a direction D perpendicular to the substrate 7. With a reduced thickness of the first fluid compared with other parts of the first fluid layer, there is a lower insulating effect caused by the first fluid at the edge of and under the protrusion. Therefore, when a voltage is applied, less energy is required at the protrusion, compared with surrounding parts of the first fluid, to initiate first fluid motion at the protrusion in both the first and second directions.

Figure 6:
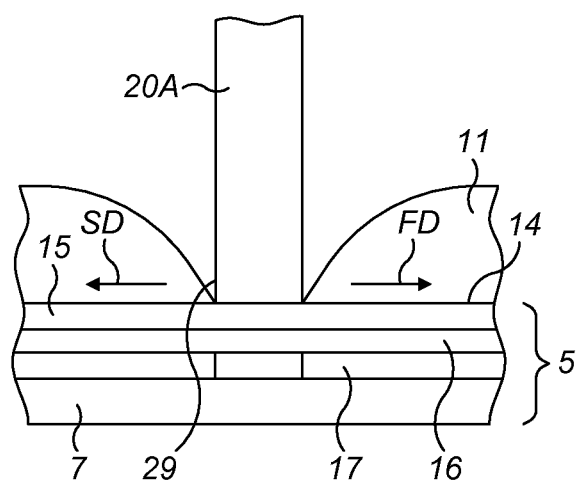

In other embodiments, a wettability to the first fluid of a surface 29 of the protrusion may be arranged to determine the first and second directions. For example, referring to FIG. 6, the protrusion may have a hydrophilic surface 29 and may be formed of a hydrophilic material. Therefore, as the protrusion surface 29 is less wettable to the first fluid than the second fluid, the first fluid is repelled by the protrusion and a thickness of the first fluid 11 decreases towards the protrusion. Thus, in a similar manner as described above with reference to FIG. 5, motion of the first fluid preferentially initiates at the protrusion as the electric field at the protrusion is greater than at other parts of the picture element when a voltage is applied. Accordingly, the protrusion determines where first fluid motion initiates and the direction of first fluid flow after initiation, in this example the first and second directions FD, SD. A surface of other walls of a picture element may have different wettabilities to the first fluid than the protrusion, to provide that the first fluid motion initiates at the protrusion rather than at other walls of the picture element. For example, the second pair of walls 20B, may have a different wettability to the first fluid, for example a greater wettability to the first fluid than the first pair of walls 20A.

It is to be appreciated that the protrusion may have one or both of a shape and a wettability to the first fluid for determining the first fluid motion initiation and the first and second directions. In further embodiments, the protrusion may be shaped differently and/or may have a different wettability to the first fluid than described above. It should be appreciated that the right hand wall 20A may be arranged to have a similar functionality as the left hand wall 20A described above.

In embodiments described above the second pair of walls 20B are shown as structures protruding from the insulating layer 13. In alternative embodiments, they may instead be a surface layer of the support plate that repels the first fluid, such as a hydrophilic layer.

Figure 7:
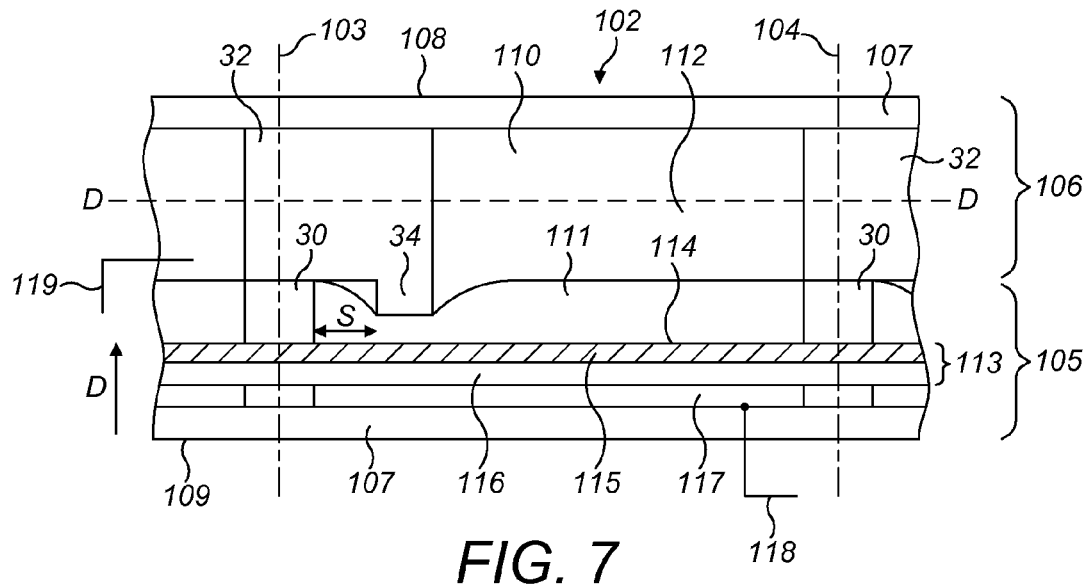
FIGS. 7 and 8 show schematically cross sections of a picture element of a different embodiment.

FIG. 7 illustrates schematically a cross section of an electrowetting display device according to a further embodiment. Features of this embodiment are similar to those described previously and are referred to and illustrated using the same reference numerals incremented by 100; corresponding descriptions should be taken to apply also.

In this embodiment, instead of the first and second pairs of walls described previously, walls 30 are arranged as part of the first support plate 105 to define the display area of the picture element 102 and to confine the first fluid to the picture element. The walls are similar to those of the second pair of walls described previously, but are for example formed as a grid to provide a plurality of walls defining a plurality of display areas for a picture element matrix. The second support plate comprises spacers 32 which are arranged to abut the top of at least one of the walls 30 when the second support plate 106 is brought together with the first support plate 105.

Figure 8:
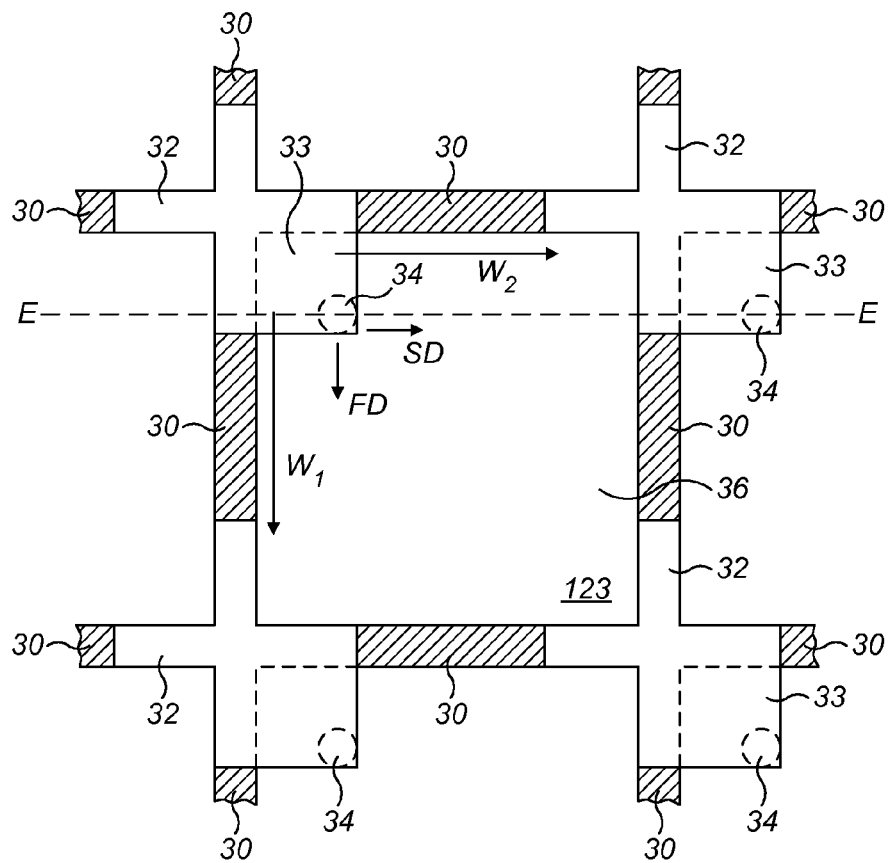

FIG. 8 shows a cross section along line D-D of FIG. 7. The walls 30 of the first support plate 105 are illustrated with hatching except where the spacers 32 are positioned on the walls 30. The underlying walls 30 are indicated with dashed lines. The spacers 32 in this embodiment are cross shaped except for a square part 33 which overhangs the display area 123. The spacers 32 are positioned on the walls 30 where four adjacent picture elements meet. Where there is no spacer on the walls 30, i.e. where the hatching is visible in the Figure, the second fluid may flow over the walls 30 between adjacent picture elements.

As FIGS. 7 and 8 show, the picture element 102 comprises a protrusion 34 arranged through the second fluid 112 and in contact with the first fluid 111 when in the first configuration. In this embodiment the protrusion does not penetrate the first fluid. In other embodiments however it is envisaged the protrusion may be at least partly immersed in the first fluid. The protrusion 34 in this embodiment is formed as part of the spacer 32. In other embodiments the protrusion 34 may be attached to, or formed from the substrate 107 of the second support plate, for example.

The protrusion 34 in this embodiment is arranged at the corner of the square part 33 of the spacer 32, and is cylindrical, having a circular cross section as illustrated in FIG. 8 with a dashed line (indicating it beneath the square part 33). The protrusion 34 is spaced by a distance S from the wall 30. In this embodiment the protrusion 34 is arranged close to a corner of the display area 123 for each picture element. In other embodiments, there may be minimal, if any, spacing between the protrusion and the wall.

FIG. 7 illustrates the first and second fluids in the first configuration, with a zero voltage applied. Referring now to FIG. 8, the protrusion is arranged to provide a preferential initiation of motion of a part of the first fluid in a first direction FD and of a different part of the first fluid in a second direction SD in the picture element 102. In this embodiment, the first fluid preferentially initiates at the protrusion and moves in a plurality of directions in addition to the first and second directions. In other words, the motion of the first fluid radiates from the protrusion in this embodiment. This is caused by the circular cross section of the protrusion; each direction of first fluid motion radiates from the protrusion in a direction perpendicular to the part of the protrusion at which the motion initiated. First fluid between the wall 30 and the protrusion 34, when initiated, at the protrusion, moves initially away from the protrusion 34 and then along the two walls nearest the protrusion, in directions $W_1$ and $W_2$. In the second fluid configuration, when a suitable voltage is applied, the first fluid may for example collect in a corner 36 of the display area 123 which is diagonally opposite the corner nearest the protrusion.

Referring again to FIG. 7, the thickness of the first fluid between the protrusion 34 and the surface 114 of the hydrophobic layer is thinner than the thickness of the first fluid layer surrounding the protrusion 34. Therefore, as explained above in relation to FIG. 5, the electric field at the protrusion is greater, with the capacitance being diminished, than elsewhere in the picture element when a voltage is applied, resulting in preferential initiation of first fluid motion at the protrusion as this is the energetically most favoured point of initiation.

Figure 9:
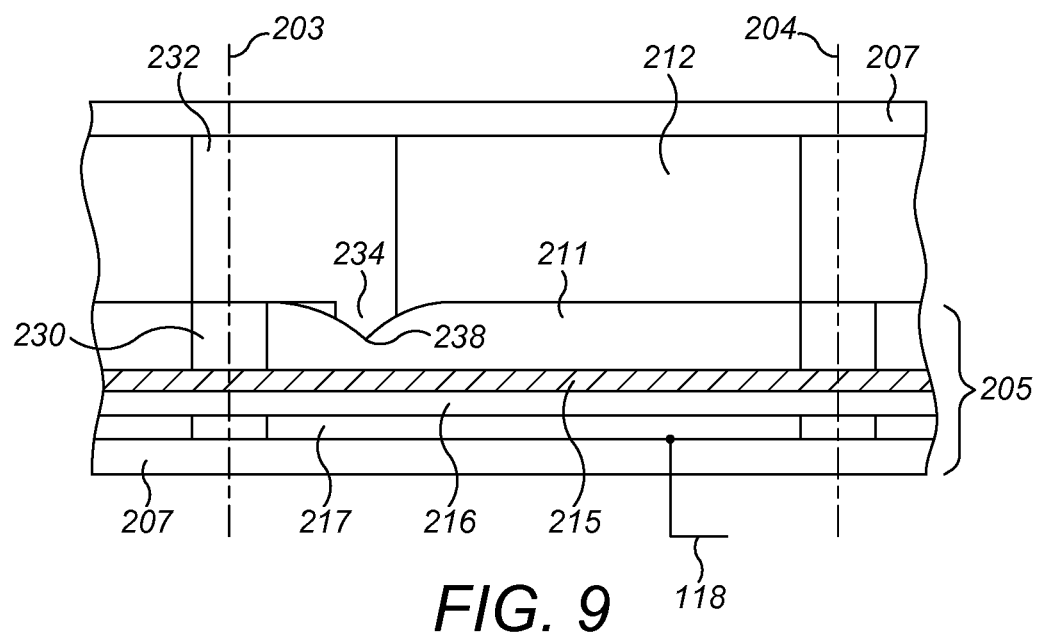
FIGS. 9 and 10 show schematic cross sections of further embodiments.
Figure 10:
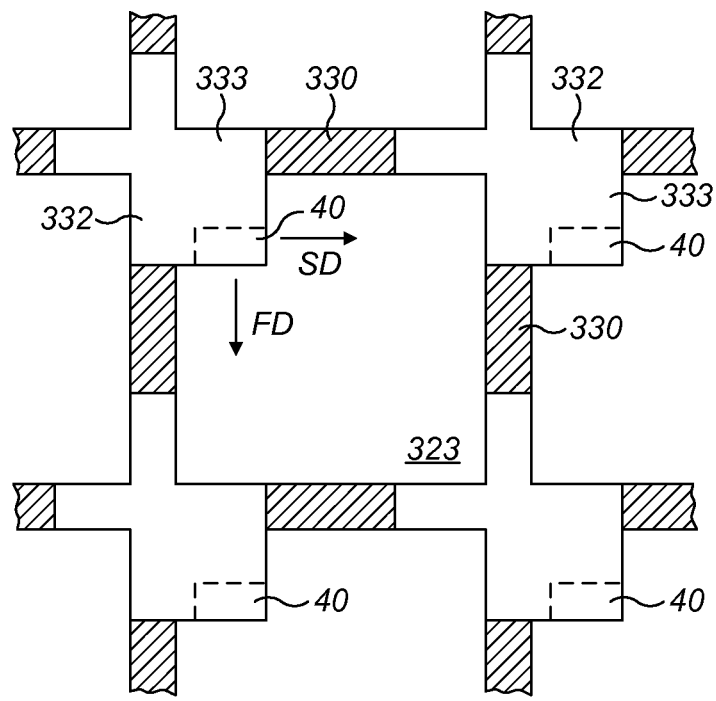

As explained above, the shape of the protrusion, and/or the wettability to the first fluid of a surface of the protrusion, may be arranged to determine the first and second directions and indeed to help determine where the first fluid motion initiates. For example, in the present embodiment, the cylindrical shape of the protrusion determines the first and second directions, and further directions of motion of the first fluid. The protrusion may be shaped differently in other embodiments, for example with a non-cylindrical cross-section. FIG. 9 illustrates such an alternative embodiment comprising features similar to those described previously; such features will be referred to using the same reference numerals, incremented by 200, and corresponding descriptions should be taken to apply here also. In FIG. 9, the surface of the protrusion 234 facing the first support plate is not flat as illustrated in FIG. 8, but instead is conical with its apex 238 pointing towards the first support plate. Such a shape of the protrusion may therefore determine initiation of first fluid motion at the apex, and thus determines also the directions of first fluid motion, including the first and second directions. FIG. 10 illustrates a further embodiment, using similar reference numerals as previously but incremented by 300 and with corresponding descriptions, which is similar to that of FIG. 8 except where the protrusions 40 have a rectangular cross section. The two sides of the rectangular protrusion 40 facing into the display area 323 determine the first direction FD and the second direction SD. The surface of the protrusion 40 may also be hydrophilic to help determine where first fluid motion initiates and the first and second directions, similar to the embodiment described above in relation to FIG. 6.

Figure 11:
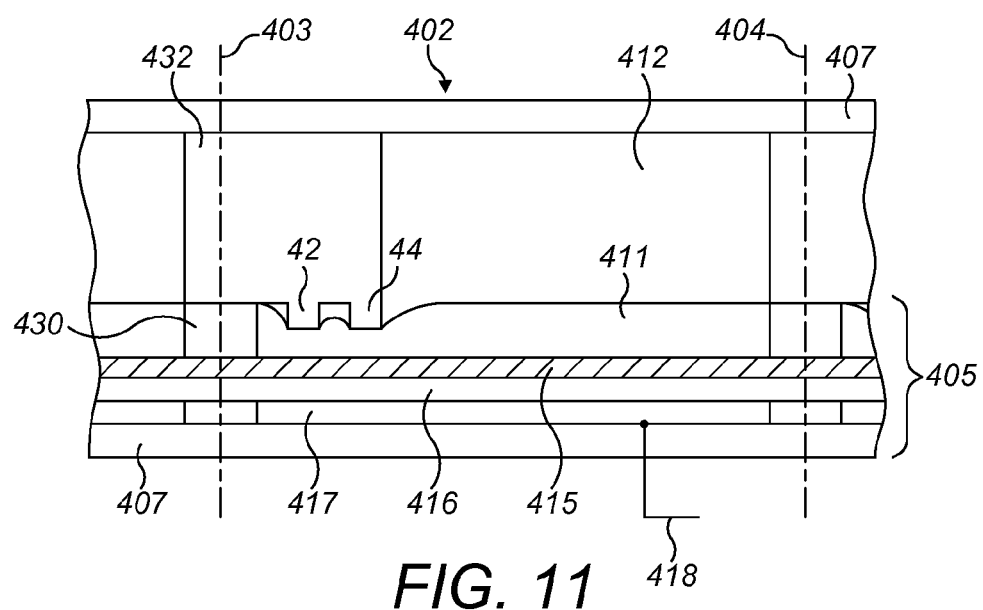
FIG. 11 shows schematically a cross section of another embodiment.

FIG. 11 illustrates a yet further embodiment, using similar reference numerals as previously but incremented by 400; corresponding descriptions should be taken to apply also. This embodiment is similar to that described using FIGS. 7 and 8 except that the picture element comprises a first protrusion 42 and a second protrusion 44. Each of the first and second protrusions are of the same shape as the cylindrical protrusion of the embodiment of FIGS. 7 and 8. The first and second protrusions are part of the spacer 432 and are arranged in the same plane of the spacer, i.e. the plane of FIG. 11 in this example. There is a gap between the first and second protrusions. The gap size may be chosen to obtain a desired display effect in the first configuration and a desired first fluid motion. As explained above, the protrusion causes preferential initiation of part of the first fluid at the protrusion. In this embodiment, as there are two protrusions, initiation occurs at the two protrusions.

If pressure is exerted on the second support plate of an electrowetting display device, towards the first support plate, the first fluid may move from its confinement in the picture element, by contacting and adhering to the second support plate. This may be referred to as a lowered ceiling effect. Further, if a pressure pulse is exerted on the second support plate, which creates a shock wave, a portion of the first fluid may be expelled from its confinement in the picture element by flowing over a wall into neighbouring picture elements. This may be referred to as a tsunami effect. The protrusion described above may be arranged to reduce an extent of movement of the second support plate towards the first support plate. For example, in relation to FIGS. 1 to 6 described above, the protrusion of the second support plate, which extends to abut the first support plate, reduces an extent of movement between the first and second support plates. The protrusion therefore may act as a preventer for preventing expulsion of the first fluid and therefore reducing or avoiding the lowered ceiling effect and/or tsunami effect in a display device. In other embodiments, for example those described above in relation to FIGS. 7 to 10, the protrusion may be part of a preventer arranged to reduce an extent of movement of the second support plate towards the first support plate. In the embodiments of FIGS. 7 to 10, the spacers between parts of the walls of the first support plate and the second support plate reduce an extent of movement of the first and second support plates towards each other. Therefore, the spacers may act as a preventer for preventing expulsion of the first fluid and therefore reduce or prevent the lowered ceiling effect and/or the tsunami effect. As explained above, the protrusion may be formed from the square part of the spacers, and therefore the protrusion may be part of a preventer. Further details of preventing the lowered ceiling effect and the tsunami effect are found in International patent publication no. WO 2009/133079, the contents of which is incorporated herein by way of reference.

The first support plate and the second support plates described previously may be manufactured using known techniques, for example using photo-lithography or embossing. In the embodiments of FIGS. 7 to 10, the protrusion may be formed by a two step process: firstly the spacer is formed on the second support plate; secondly the protrusion is formed. Once the first and second support plates are made, the first and second fluids are provided between the first and second support plates, the first and second support plates are aligned with each other, and the support plates are coupled to each other to form the display device. The walls, protrusion and spacers described above may be formed of SU8 or another suitable material. In embodiments where there is a space above walls of the first support plate, for example the embodiments of FIGS. 1 to 4, filling the display device with the first and second fluids may be simplified as the fluids can flow over the walls during filling.

The above embodiments are to be understood as illustrative examples. Further embodiments are envisaged. For example, the shape of any of the walls, spacers and protrusions described above may be different in other embodiments. In some embodiments, the walls of the first and second support plates may nonetheless need to interlock with each other. In other embodiments, although one example is given above for FIG. 11 with two protrusions, further embodiments are envisaged which may comprise more than one or two protrusions, possibly which are non-cylindrical in shape, and which may be located at different positions in the picture element than described above. Further, whereas in the embodiments of FIGS. 7 to 11 the protrusion or protrusions do not contact the first support plate, in alternative embodiments the protrusion or protrusions may contact the first support plate. The dimensions of the spacers and the protrusions may in certain embodiments be as small as possible and/or of a suitable transparency to maximise the display area which is viewable without interference by the protrusions.

In the embodiments of FIGS. 8 and 10, examples are given where the protrusion is at the same location in each picture element. In other embodiments the protrusion may be located at a different location in different picture elements. For example, referring to FIG. 12, an embodiment is illustrated where features are similar to those described previously. Such features are referred to using the same reference numerals, incremented by 500; corresponding descriptions should be taken to apply also. In this embodiment a spacer 532 has four square parts 533; by locating the spacer on the junction of the walls 530 between four picture elements, each square part 533 overhangs a corner area of the display area 523 of a different picture element. A protrusion 534 is formed at a corner of each square part. Each protrusion 534 is cylindrical and is arranged in the picture element in a similar manner as the protrusion described above in relation to FIGS. 7 and 8. Therefore, in this embodiment, one spacer is arranged to provide preferential initiation of first fluid motion in four different picture elements. For a matrix of picture elements, such a spacer 532 may be provided for each set of four adjacent picture elements, so that preferential initiation of first fluid motion is provided in each picture element of the matrix. Thus, the aggregate effect of first fluid motion in four adjacent picture elements may be that a greater white area, for example where each picture element is in the second configuration, is achievable over the four picture elements and therefore over the entire display.

As explained above, the protrusion provides preferential initiation of first fluid motion in a first direction FD and a second direction SD, and part of the first fluid between the protrusion and the walls may move along walls in directions $W_1$ and $W_2$ if there is a space between the protrusion and the walls. In other embodiments, it is to be appreciated that the spacer may be differently formed from that just described. For example a protrusion may be provided in fewer or more than four picture elements. Further, the protrusions may be formed for example as another part of the second support plate than the spacer, for example the substrate.

Figure 13:
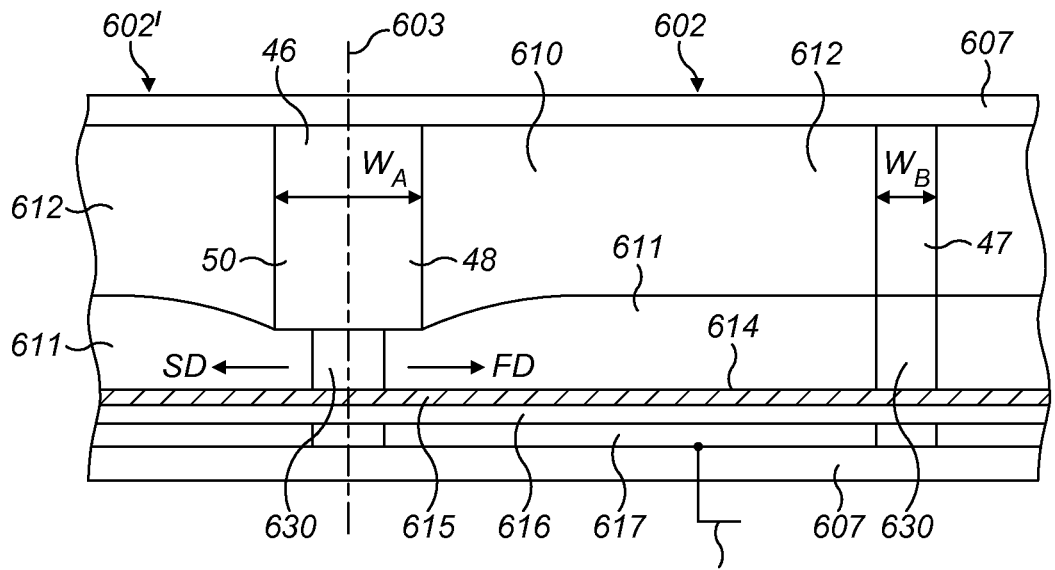
FIGS. 13 to 15 illustrate an alternative embodiment.
Figure 14:
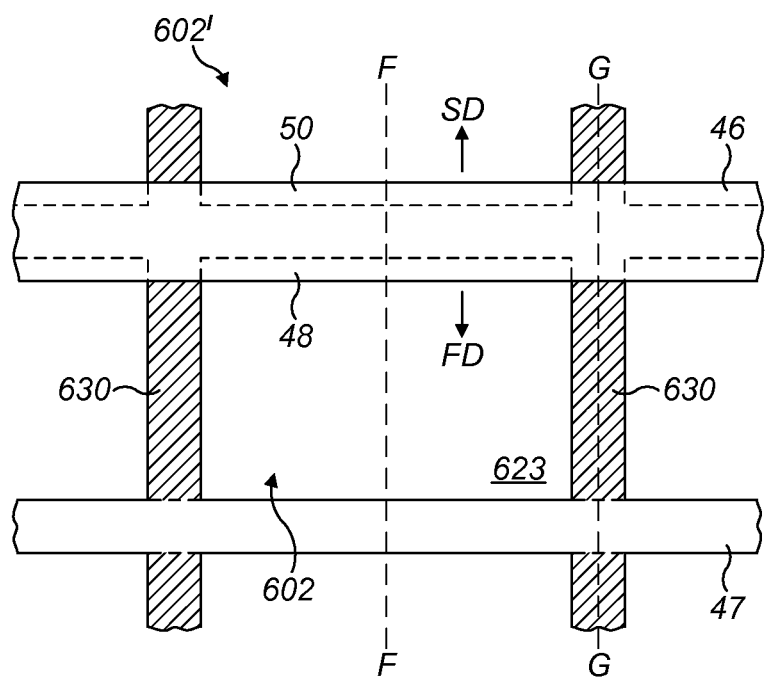
Figure 15:
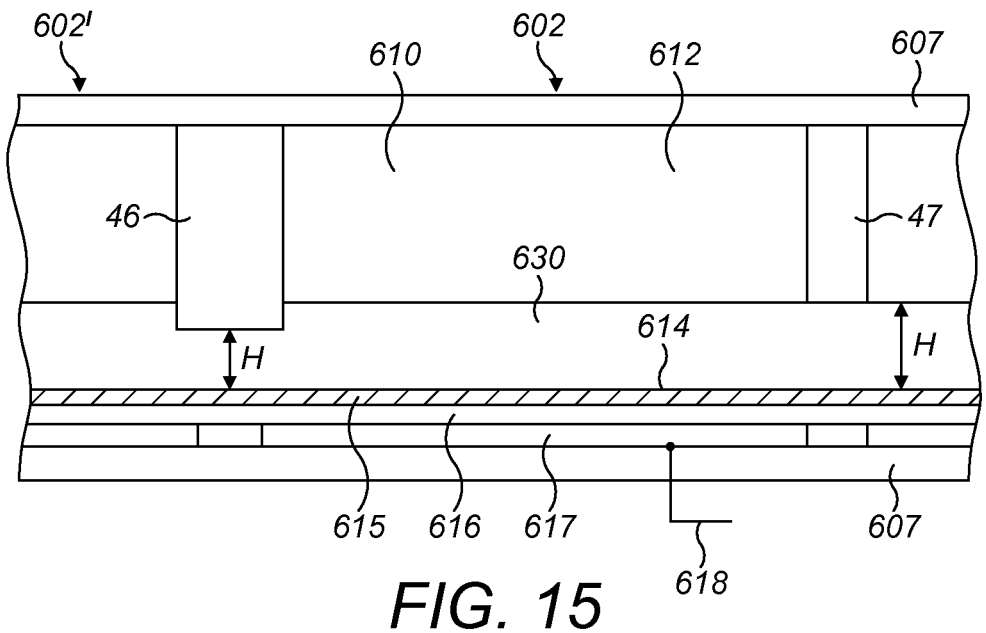

FIGS. 13 to 15 schematically illustrate a further embodiment. Features of this embodiment are similar to those described previously and will be referred to using the same reference numerals, incremented by 600; corresponding descriptions should be taken to apply here also. FIG. 13 is a cross-section taken in the plane F-F indicated in FIG. 14 and FIG. 15 is a cross-section taken in the plane G-G indicated in FIG. 14.

In this embodiment a first spacer 46 is provided on a wall 630 of the first support plate, which wall defines one side of the display area 623. A second spacer 47 is provided on another one of the walls 630 which wall defines a different side of the display area, in this embodiment a side opposite the side of the first spacer. The first spacer has a width $W_A$ greater than a width of the wall 630 supporting the first spacer. The width is taken along an axis parallel to a plane of the display area surface 614. Therefore, a first part 48 of the first spacer overhangs part of the display area of the picture element. Further, the height of the first spacer, taken along the axis H described below, is great enough so that the first part passes through the second fluid and contacts the first fluid. In this embodiment the width $W_A$ of the first spacer is sufficiently wider than the underlying wall 630 (which is indicated under the first spacer 46 with a dashed line in FIG. 14), and the first spacer is arranged on the wall 630 appropriately, so that a second part 50 of the first spacer overhangs part of the display area of an adjacent picture element 602'. The second part has the same height as the first part. In this embodiment the first spacer is a protrusion in accordance with embodiments described previously. Accordingly, the first spacer is arranged through the second fluid 612 and is in contact with the first fluid 611 in the first configuration to provide, as explained for previous embodiments, a preferential initiation of motion of part of the first fluid in a first direction FD and a different part of the first fluid in a second direction SD for switching from the first configuration to the second configuration. In this embodiment the spacer, i.e. the protrusion, provides the first direction in one picture element, caused by the first part 48, and the second direction in a different picture element, caused by the second part 50. The preferential initiation is due to a lower thickness of the first fluid between the surface of the display area of the appropriate picture element and the first and second parts of the protrusion, as explained previously.

The width $W_B$ of the second spacer 47 is in this embodiment the same as the width of the underlying wall 630 supporting the second spacer. The second spacer is thus arranged on the wall 630 so that no parts overhang part of the display area 623. Therefore, no preferential initiation of the first fluid is caused by the second spacer. The walls 630 have a lower height where the wall 630 supports the first spacer compared with a greater height where the wall 630 does not support a spacer and in this embodiment also in places where the wall supports the second spacer. The height H is taken along an axis perpendicular to a plane of the surface 614 of the display area. The greater height where the first spacer does not meet the walls 630 allows those walls to confine the first fluid 611 to the picture element. The lower height wall allows the spacer to provide a lower thickness of the first fluid for preferential initiation. Where the wall has a lower height, the first spacer helps to confine the first fluid to the picture element, in this example because the protrusion 48 reduces a thickness of part of the first fluid. To manufacture the first support plate with walls having different parts of different heights, a two step photolithographic process may be used, a grey scale photo-lithographic mask may be used so that more wall material is deposited at the locations where a greater wall height is required compared with where a lower wall height is required, or an embossing technique may be used.

Figure 16:
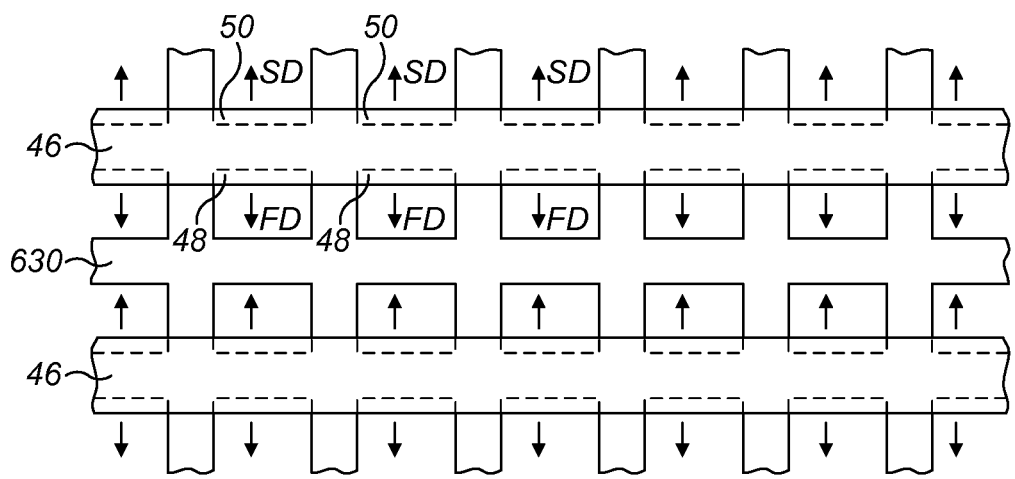
FIGS. 16 and 17 illustrate schematically examples of picture element matrices according to further alternative embodiments.

FIG. 16 is similar to FIG. 14 but illustrates how this embodiment is applied for a matrix of picture elements. In such a matrix, the first spacer 46 extends for a plurality of picture elements and is provided for every second row or column of picture elements. Therefore, each picture element of each row or column of picture elements has a preferential direction of first fluid motion.

Figure 12:
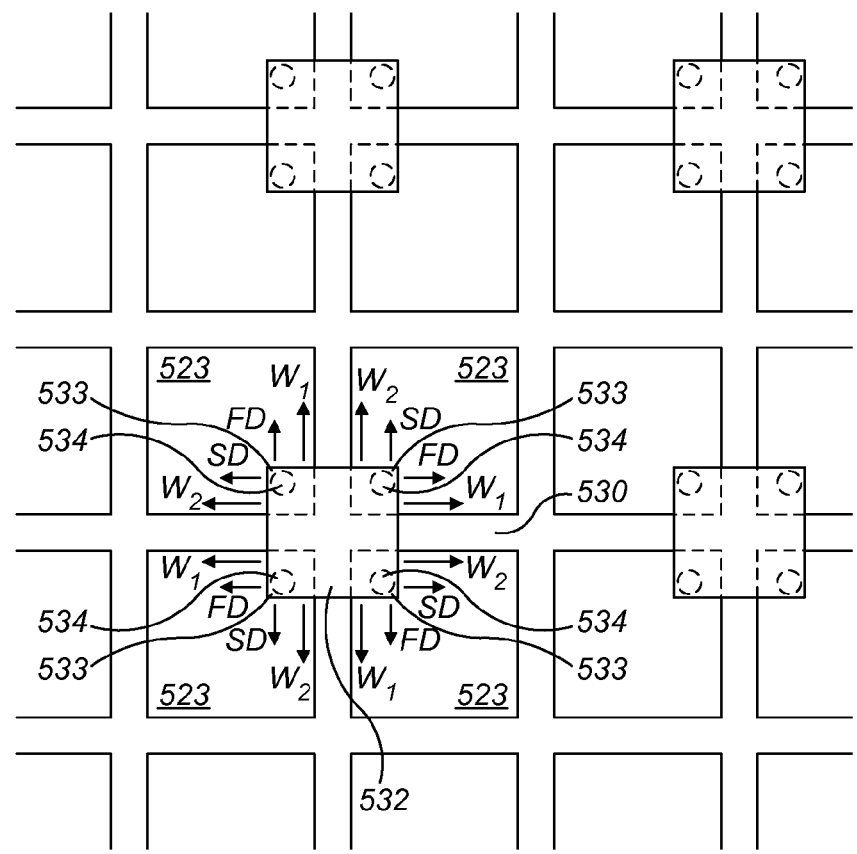
FIG. 12 illustrates schematically a matrix of picture elements in accordance with embodiments.
Figure 17:
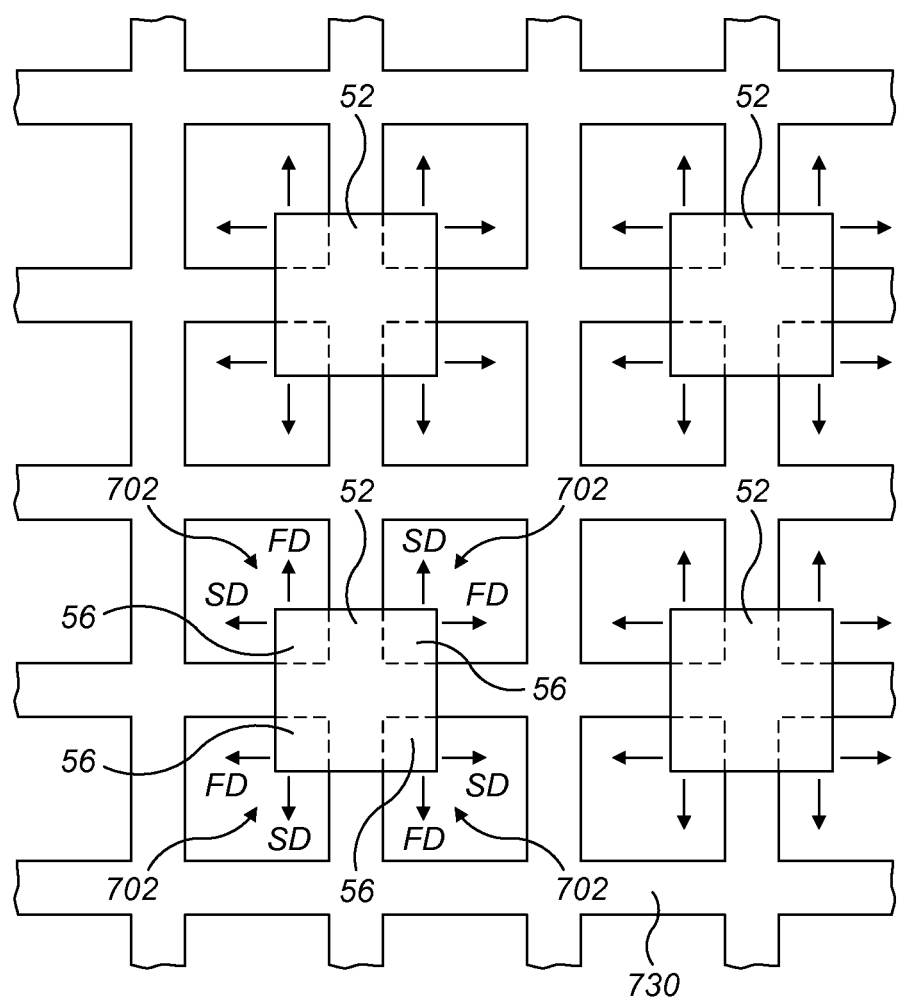

Further embodiments are envisaged which are similar to the embodiment just described, namely where at least part of a spacer has a width greater than a part of a wall supporting the spacer, thereby providing a protrusion in a picture element. For example, FIG. 17 illustrates an alternative embodiment where similar features described previously are referred to using the same reference numerals incremented by 700 and with corresponding descriptions taken to apply. In this embodiment, a spacer 52 similar to the spacer 532 of FIG. 12 is provided. However, in this embodiment one spacer 52 is a protrusion providing four parts 56 which each overhang a corner of the display area of a different picture element. Each part 56 is provided by the appropriate part of the spacer 52 which is greater in width than the width of the part of the walls 730 supporting that part of the spacer 52. Moreover, the height of the spacer is sufficient so as to pass through the second fluid and contact or penetrate the first fluid. Therefore, preferential initiation of first fluid motion is provided in the first direction FD and the second direction SD in each picture element. As illustrated in FIG. 17, the spacer 52 may be provided at the junction of a plurality of sets of four adjacent picture elements, so that the preferential initiation in the first and second directions is provided in each picture element of a matrix of picture elements.

Further spacers may be provided at other locations on the walls, which further spacers do not provide a protrusion in accordance with embodiments, but which act as preventers.

Further embodiments are envisaged where a protrusion in accordance with embodiments described previously is provided by a spacer having a part with a width greater than the width of a wall supporting that part. For example, a cross shaped spacer may have parts with a greater width than underlying parts of a wall, or a cylindrical spacer may have a diameter greater than the underlying wall width.

In the embodiments of FIGS. 7 to 17 the material forming the spacer and the protrusion of the second support plate may be different from the material forming the walls on the first support plate. For example, the wettability to the first fluid of the materials may be different and selected to assist control of first fluid motion in the picture element. The materials may be chosen depending on the function to be performed. For example, the spacer may be formed of a rigid material to give the display rigidity and help reduce the lowered ceiling effect and tsunami effect.

In embodiments described above the protrusion may cause a thinning of a part of the first fluid layer, for example for first fluid under the protrusion, or where the first fluid thickness decreases towards the protrusion. Parts of the display corresponding to such thinner first fluid parts may therefore appear lighter in the first configuration than elsewhere in the picture element. To compensate and provide an improved contrast ratio, a part of the support plate above the protrusion may be coloured, darkened or blackened. This can achieve for example a contrast ratio of 29/4=7.25 compared with a contrast ratio of 30/5=6 without the compensatory measures.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising a first support plate, a second support plate and at least one picture element comprising a space between the first and second support plates, the space including a first fluid and a second fluid immiscible with the first fluid, the first and second fluids having a first configuration when a zero voltage is applied to the second fluid and a different, second configuration when a non-zero voltage is applied to the second fluid, wherein the at least one picture element comprises a protrusion arranged through the second fluid and in contact with the first fluid in the first configuration to provide a preferential initiation of motion of part of the first fluid in a first direction and a different part of the first fluid in a second direction for switching from the first configuration to the second configuration.

2. An electrowetting display device according to claim 1, the at least one picture element including a first picture element and a second picture element, wherein the protrusion is arranged to provide the first direction in the first picture element and the second direction in the second picture element.

3. An electrowetting display device according to claim 2, wherein the protrusion is a wall of the second support plate arranged to form a side of the at least one picture element.

4. An electrowetting display device according to claim 1, wherein the at least one picture element comprises a first picture element and the protrusion is arranged to provide the first and second directions in the first picture element.

5. An electrowetting display device according to claim 4, wherein the protrusion is a first protrusion and the first picture element comprises a second protrusion, the first and second protrusions together providing the first direction and the second direction.

6. An electrowetting display device according to claim 1, wherein the protrusion is arranged at least partly through the first fluid when in the first configuration.

7. An electrowetting display device according to claim 1, wherein the protrusion is arranged to reduce an extent of movement of the second support plate towards the first support plate.

8. An electrowetting display device according to claim 1, wherein the protrusion is part of a preventer arranged to reduce an extent of movement of the second support plate towards the first support plate.

9. An electrowetting display device according to claim 8, wherein the protrusion is formed by a part of the preventer with a width greater than a width of a wall part at least partly supporting the part of the preventer.

10. An electrowetting display device according to claim 1, wherein a shape of the protrusion is arranged to determine the first direction and the second direction.

11. An electrowetting display device according to claim 1, wherein a wettability to the first fluid of a surface of the protrusion is arranged to determine the first direction and the second direction.

12. An electrowetting display device according to claim 1, wherein the protrusion is arranged at least partly to confine the second fluid of the at least one picture element.

13. An electrowetting display device according to claim 12, comprising at least one wall of the first support plate arranged to confine at least part of the first fluid of the at least one picture element, at least one of said protrusion being arranged to confine at least part of the first and second fluid of the at least one picture element.

14. An electrowetting display device according to claim 13, wherein a wettability to the first fluid of the at least one wall is different from a wettability to the first fluid of the at least one protrusion.

15. An electrowetting display device according to claim 14, wherein the wettability to the first fluid of the at least one wall is greater than the wettability to the first fluid of the at least one protrusion.

16. An electrowetting display device according to claim 1, wherein at least part of the protrusion is separated from a surface of the first support plate by part of the first fluid.

17. An electrowetting display device according to claim 1, wherein at least part of the protrusion contacts a surface of the first support plate.

18. An electrowetting display device according to claim 1, wherein the protrusion is part of the second support plate.

19. An electrowetting display device according to claim 1, wherein the protrusion is spaced from a wall of the at least one picture element.

20. An electrowetting display device according to claim 4, wherein the protrusion is a first protrusion and the at least one picture element comprises a second protrusion.

21. An electrowetting display device according to claim 1, wherein a thickness of a first part of the first fluid between the protrusion and the first support plate is less than a thickness of a second part of the first fluid between the second fluid and the first support plate.

\* \* \* \* \*